A. O. WILLIAMS.
DIFFERENTIAL GEARING.
APPLICATION FILED JUNE 25, 1917.

1,310,976.

Patented July 22, 1919.
2 SHEETS—SHEET 1.

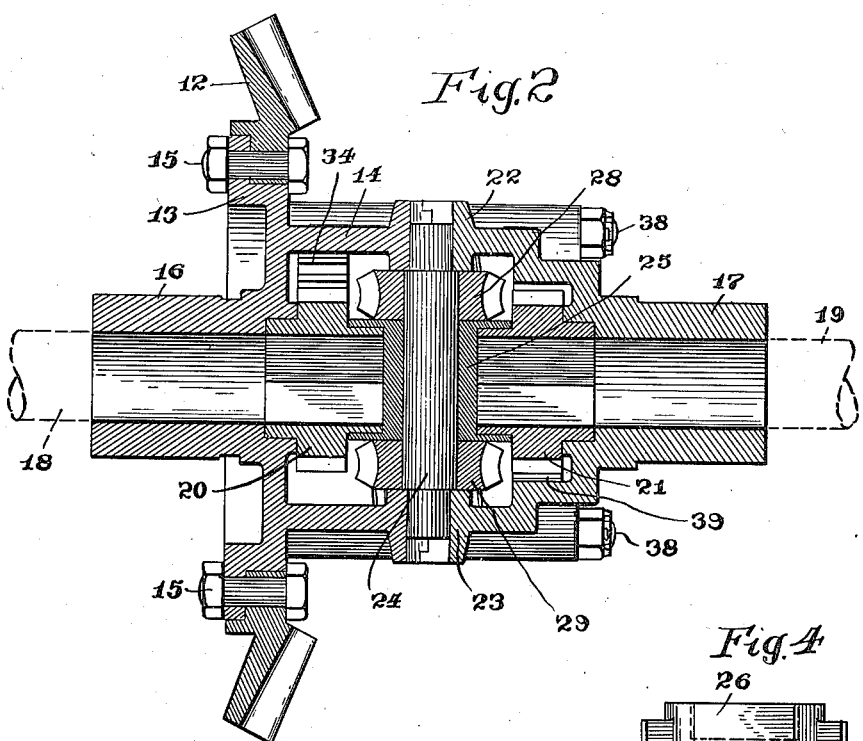
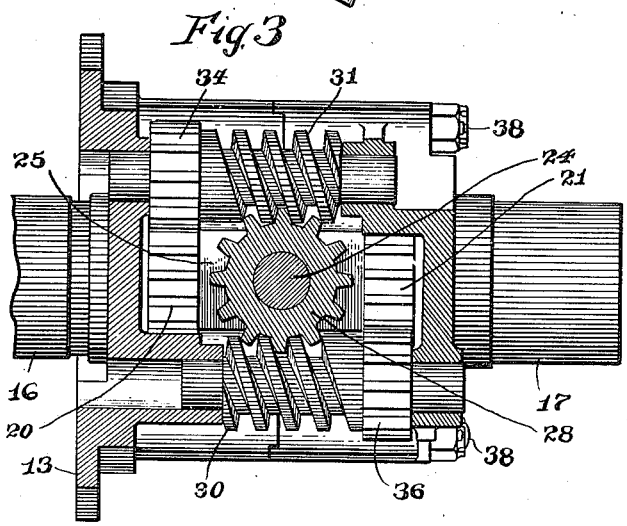
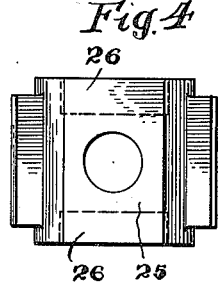
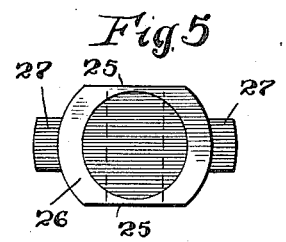

UNITED STATES PATENT OFFICE.

ALFRED O. WILLIAMS, OF SOUTH BEND, INDIANA, ASSIGNOR TO CLARK EQUIPMENT COMPANY, OF BUCHANAN, MICHIGAN, A CORPORATION OF MICHIGAN.

DIFFERENTIAL GEARING.

1,310,976.      Specification of Letters Patent.      Patented July 22, 1919.

Application filed June 25, 1917. Serial No. 176,792.

*To all whom it may concern:*

Be it known that I, ALFRED O. WILLIAMS, a citizen of the United States, and a resident of South Bend, in the county of St. Joseph and State of Indiana, have invented certain new and useful Improvements in Differential Gearings, of which the following is a specification, reference being had to the accompanying drawings.

My invention relates to differential gearing for motor vehicles, and has for its object to provide certain improvements in differential gearing of the type illustrated and described in Letters Patent No. 1,195,314, granted to me August 22, 1916, in which the driving power is transmitted from the motor or other source of power to the axle shafts of the motor vehicle by means of a main drive gear and a system of pinions, worms and worm wheels which coöperate to transmit power equally to both traction wheels when the vehicle is running straight ahead, but permit one wheel to rotate more rapidly than the other on curves as when turning a corner. In the construction shown and described in my said patent, the worms are irreversible; *i. e.*,—the worms cannot be driven by power applied to their respective worm wheels, and consequently a relative difference in rotative speed as between the two wheels under the action of the driving power is rendered impossible. While this construction is efficient and valuable under appropriate conditions, certain situations are encountered in connection with the use of motor vehicles, and particularly of heavy vehicles such as motor trucks, in which it is desirable and important that the traction wheels be not positively locked against variation in speed under the action of the propelling power, but be capable of slight variation in such relative speed, and my present invention accomplishes this end in the manner and by the means hereinafter described.

What I regard as new is set forth in the claims.

In the accompanying drawings:

Fig. 2 is a section on line 2—2 of Fig. 1;

Fig. 3 is a section on line 3—3 of Fig. 1;

Fig. 4 is a plan view of a guide and bearing block which forms one of the elements of the device illustrated; and Fig. 5 is an end view of the block shown in Fig. 4.

Figure 1:
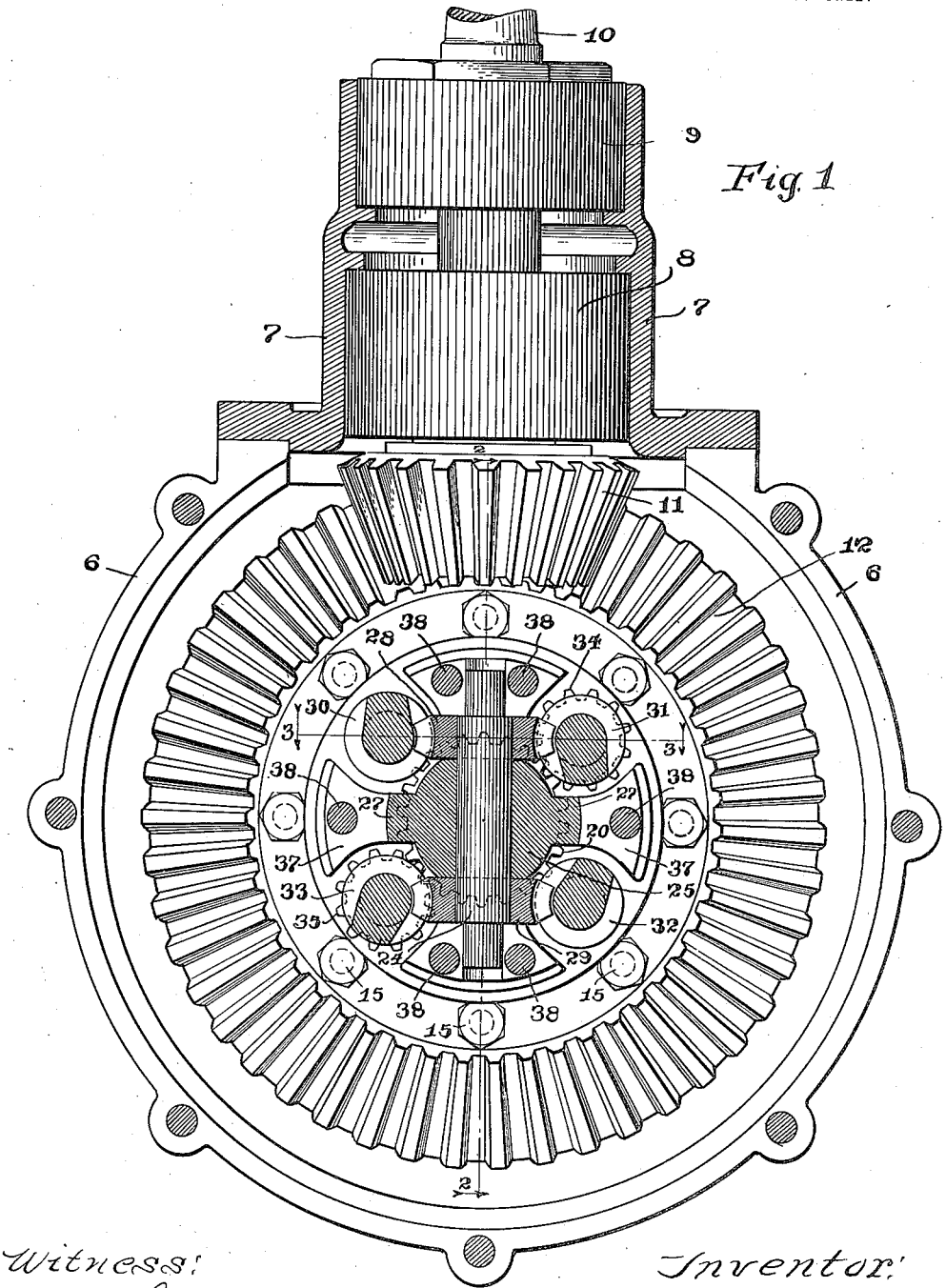
Figure 1 is a transverse sectional view through the differential housing illustrating my improved construction, certain parts being in elevation.

Referring to the drawings, 6 indicates the differential housing, which may be of any suitable construction, and 7 indicates a sleeve or housing which supports the bearings 8—9 of the usual propeller shaft 10. The sleeve 7 is secured to the differential housing 6 in any suitable way as by bolts. The shaft 10 carries at its inner end a beveled pinion 11 which meshes with and drives a ring gear 12 which is a part of the differential mechanism and constitutes the main drive gear thereof. As best shown in Fig. 2, said ring gear is secured to an annular flange 13 carried by a shell or support 14 which supports the various other parts of the differential gearing. 15 indicates bolts which secure the ring gear 12 to the flange 13. The shell 14, which is split intermediately, as shown in the drawings, is provided with oppositely-extending alined sleeves 16—17 disposed coaxially with the ring gear 12 and adapted to receive the inner ends of vehicle axle shafts 18—19 indicated in dotted lines in Fig. 2. The inner ends of said sleeves also form bearings for spur pinions 20—21 which are adapted to fit upon the inner ends of the shafts 18—19 for driving said shafts. It will be understood that the bores of the pinions 20—21 are square or otherwise made non-circular, and the inner ends of the shafts 18—19 are correspondingly shaped so that the engagement between said shafts and said pinions is a non-rotatable one.

22—23 indicate bearings at opposite sides of the shell 14 positioned at right angles to the sleeves 16—17 with their axes intersecting the axes of said sleeves, as shown in Fig. 2. 24 indicates a shaft mounted in the bearings 22—23 between the inner ends of the shafts 18—19. Said shaft carries a guide block 25 the opposite ends of which are provided with circular recesses 26 which form bearings for the adjacent ends of the pinions 20—21, as shown in Fig. 2. Said block is also provided with lugs 27 positioned at right angles to the recesses 26 for a purpose which will be hereinafter described. It will be noted by an inspection of Fig. 2, that said block not only supports the pinions 20—21 at one side, but also holds them against movement in an axial direction. 28—29 indicate worm wheels which are mounted upon the shaft 24 at opposite sides of the block 25 and between said block and the bearings 22—23, respectively. Said worm wheels are not keyed to the shaft 24 so that they are free to rotate thereon. 30—31, 32—33 indicate two pairs of worms which are mounted in suitable bearings in the shell 14, one pair of said worms being at opposite sides of and in mesh with the worm wheel 28 and the other pair being similarly disposed with reference to the worm wheel 29. The axes of all of said worms are parallel with the axis of the drive gear 12 and they are symmetrically disposed about such axis, as illustrated in Fig. 1. While in the drawings I have shown my improved differential as provided with two pairs of worms and two worm wheels, any desired number of pairs of worms and a corresponding number of co-acting worm wheels may be employed. The diametrically opposite worms of said two pairs are provided with pinions 34—35, respectively, which mesh with the spur pinion 20, and the other two worms are provided with similar pinions 36—39, as shown in Figs. 2 and 3, which mesh with the pinion 21. The lead angle of the several worms is a little more than an angle of 14½° measured from a plane perpendicular to the axis of the worm, as I have found that an angle of less than 14½° makes the worms irreversible, but the lead angle of such worms should not be much less than 14½°, nor greater than 40° as it is essential in order to realize the advantages of my present invention that the worms be not freely reversible, but be reversible only in a limited sense.

As best shown in Fig. 1, the shell 14 is provided with inwardly-projecting lugs 37 between the worms 30 and 33 and 31 and 32, respectively, against the inner ends of which the lugs 27 bear, thus further holding the parts properly in position. 38 indicates bolts which hold the members of the shell together.

The mechanism described operates as follows: Power being applied to the gear ring 12 the shell 14 with the parts therein contained will rotate, and both axle shafts 18—19, under normal conditions as when driving straight ahead, will rotate in unison with said gear owing to the fact that the worm wheels 28—29 then hold the several worms against rotation on their own axes, and consequently through the pinions 34, 35, 36, 39, and 20—21 the rotation of the shell will cause the shafts 18—19 to rotate. In rounding a curve or turning a corner, where one wheel necessarily travels a greater linear distance than the other, the usual differential action occurs, the speed of the shell being the mean between the speeds of the two traction wheels. If, however, the traction of one of the wheels is reduced, the driving power does not all go to the free wheel, as is the case in many of the forms of differential gearing in use, neither is the power applied equally to both traction wheels as occurs in the construction described in my said patent, but the power is unequally distributed as between the two wheels, a somewhat less proportion going to the free wheel and the rest going to the wheel having traction. Consequently the propulsion of the vehicle is maintained.

The advantages obtained by my improved construction are that the increasing of the lead angle of the worm thread accomplishes a proportionate reduction in the loads on the worm thread and the worm gear teeth, and by making it possible for part of the driving force to escape through the worm and worm gear any sudden application of power will not cause such great strains on the gears and other parts. Furthermore, any lead angle of the worm thread between 14½ degrees and 40 degrees will allow the escaping force to drive the outside wheel when turning a curve, whereas with a lead angle of 14½ degrees or less it is not possible for the outside wheel to do any of the propelling of the vehicle in driving around a curve.

What I claim as my invention and desire to secure by Letters Patent, is:

1. A differential gearing comprising a suitable support, a drive gear carried by said support, axle shafts journaled in said support concentrically with the axis of said drive gear, pinions connected with said axle shafts, a shaft mounted in said support and intersecting the axis of said drive gear at a right angle, one or more worm wheels carried by the latter shaft, worms mounted in said support and meshing with said worm wheels, the threads of said worms being at an angle of more than 14½°, and pinions connected with said worms and meshing with said first-mentioned pinions.

2. A differential gearing comprising a suitable support, a drive gear carried by said support, axle shafts journaled in said support concentrically with the axis of said drive gear, pinions connected with said axle shafts, a shaft mounted in said support and intersecting the axis of said drive gear at a right angle, worm wheels mounted upon the latter shaft, pairs of worms mounted in said support and meshing with said worm wheels respectively at opposite sides thereof, the threads of said worms being at an angle of more than 14½°, and pinions connected with said worms and respectively meshing alternately with said first-mentioned pinions.

3. A differential gearing comprising a suitable support, a drive gear carried by said support, axle shafts journaled in said support concentrically with the axis of said drive gear, a worm wheel supporting shaft mounted in said support and intersecting the axis of said drive gear at a right angle, a block mounted on said worm wheel supporting shaft, pinions journaled at one side in said support and at the other side in said block, said pinions being connected to rotate with said axle shafts, one or more worm wheels mounted on said worm wheel supporting shaft, worms meshing with said worm wheels, and pinions connected with said worms and meshing respectively with said first-mentioned pinions.

4. A differential gearing comprising a suitable support, a drive gear carried by said support, axle shafts journaled in said support concentrically with the axis of said drive gear, a worm wheel supporting shaft mounted in said support and intersecting the axis of said drive gear at a right angle, a block mounted on said worm wheel supporting shaft, lugs carried by said block and bearing against opposite sides of said support, pinions journaled at one side in said support and at the other side in said block, said pinions being connected to rotate with said axle shafts, one or more worm wheels mounted on said worm wheel supporting shaft, worms meshing with said worm wheels, and pinions connected with said worms and meshing respectively with said first-mentioned pinions.

ALFRED O. WILLIAMS.